United States Patent [19]

Jadamus et al.

[11] 4,218,549
[45] Aug. 19, 1980

[54] THERMOPLASTIC MOLDING COMPOSITIONS HAVING IMPROVED FLEXIBILITY AND COLD IMPACT STRENGTH BASED UPON POLYAMIDES FROM OMEGA-AMINOCARBOXYLIC ACIDS AND/OR LACTAMS HAVING AT LEAST 10 CARBON ATOMS

[75] Inventors: Hans Jadamus; Salih Mumcu; Klaus Burzin; Rainer Feldmann; Roland Feinauer, all of Marl, Fed. Rep. of Germany

[73] Assignee: Chemische Werke Hüls Aktiengesellschaft, Marl, Fed. Rep. of Germany

[21] Appl. No.: 888,652

[22] Filed: Mar. 21, 1978

[30] Foreign Application Priority Data

Apr. 9, 1977 [DE] Fed. Rep. of Germany ....... 2716004

[51] Int. Cl.² .............................................. C08L 77/00
[52] U.S. Cl. .................................................. 525/420
[58] Field of Search ................. 260/857 TW, 857 PE, 260/78 R, 78 L; 525/419, 420

[56] References Cited

U.S. PATENT DOCUMENTS

| | | | |
|---|---|---|---|
| 3,729,449 | 4/1973 | Remura et al. | 260/857 TW |
| 3,944,629 | 3/1976 | Hedrick et al. | 260/857 PE |
| 3,993,709 | 11/1976 | Hedrick et al. | 260/857 PE |

FOREIGN PATENT DOCUMENTS 1473972  5/1977  United Kingdom ..................... 260/78

Primary Examiner—J. Ziegler
Attorney, Agent, or Firm—Gilbert L. Wells

[57] ABSTRACT

Thermoplastic molding compositions having improved flexibility and cold impact strength, comprising a mixture of:

I. at least one polyamide from omega-aminocarboxylic acids or lactams having at least 10 carbon atoms; and II. at least one polyether ester amide with units of the starting components randomly distributed in the polymer chain produced from:
 (a) omega-aminocarboxylic acid or lactams having at least 10 carbon atoms,
 (b) alpha, omega-dihydroxy(polytetrahydrofuran) having a molecular weight of between 160 and 3,000 and
 (c) a dicarboxylic acid.

The mixture contains about 95 to 20 percent by weight of component I and about 5 to 80 percent by weight of component II.

6 Claims, No Drawings

THERMOPLASTIC MOLDING COMPOSITIONS HAVING IMPROVED FLEXIBILITY AND COLD IMPACT STRENGTH BASED UPON POLYAMIDES FROM OMEGA-AMINOCARBOXYLIC ACIDS AND/OR LACTAMS HAVING AT LEAST 10 CARBON ATOMS

CROSS REFERENCES TO RELATED APPLICATIONS

Applicants claim priority under 35 USC 119 for application P 27 16 004.9, filed Apr. 9, 1977 in the Patent Office of the Federal Republic of Germany.

The disclosure of copending application Ser. No. 717,358 of Klaus Burzin et al filed Aug. 24, 1976, now U.S. Pat. No. 4,101,524 is incorporated herein. Also incorporated herein is applicants' copending application entitled "METHOD FOR THE PREPARATION AND USE OF POLYETHER ESTER AMIDES WITH UNITS OF THE STARTING COMPONENTS RANDOMLY DISTRIBUTED IN THE POLYMER CHAIN", having Ser. No. 888,649 and filed on the same day as the present application.

BACKGROUND OF THE INVENTION

The field of the invention is mixtures of Polyamides and Polyether Ester Amides.

The state of the art of preparing polyester amides may be ascertained by reference to British Patent No. 1,473,972 and U.S. Pat. Nos. 3,944,629 and 3,993,709, the disclosures of which are incorporated herein.

It is known that plasticized polyamides, especially also polylauryllactam and polyundecanoic acid amide are utilized as molding compositions for the production of molded articles in accordance with the extrusion and/or injection-molding methods. Such molded articles, as is known, are more flexible at moderate and higher temperatures than the plasticizer-free products. However, it is well-known that the use of plasticizers entails the disadvantage that they can bleed out of the molded article or that they can be dissolved out of this article. At low temperatures, the plasticized molded articles do not show adequate impact strength.

SUMMARY OF THE INVENTION

The object of the invention is to overcome the disadvantage of the state of the art by discovering molding compositions which exhibit a greater flexibility and strength and which, in addition, have an excellent cold impact strength.

This object is successfully met by the utilization of molding compositions according to the invention.

The thermoplastic molding compositions of the present invention having improved flexibility and cold impact strength, comprise a mixture of:

I. at least one homopolymer for omega-aminocarboxylic acids or lactams of at least 10 carbon atoms; and II. at least one polyether ester amide with units of the starting components randomly distributed in the polymer chain produced from:

(a) omega-aminocarboxylic acid or lactams having at least 10 carbon atoms, (b) alpha, omega-dihydroxy(polytetrahydrofuran) having a molecular weight of between 160 and 3,000, and (c) a dicarboxylic acid.

The mixture contains about 95 to 20 percent by weight of component I homopolymer and about 5 to 80 percent by weight of component II copolymer.

DESCRIPTION OF THE PREFERRED EMBODIMENTS

To produce the molding composition of the present invention, granulated material made from components I and II is melted and homogenized in extruders, especially twin-screw extruders. It is also possible to process the mixtures of granulated material directly and homogenization then takes place in the processing machine.

Insofar as components I and II still contain no additives, the usual processing aids, such as lubricants or stabilizers, are added thereto. Furthermore, the molding compositions may, if desired, contain fillers such as glass fibers, micronized glass beads or delusterants such as titanium dioxide or zinc sulfide or also fireproofing agents. Moreover, conventional plasticizers may also be added thereto, if desired. The flexibility is further increased by the plasticizers. To attain the same flexibility, lesser amounts of plasticizers are necessary than with polyamides. Plasticizer-containing molding compositions of the present invention exhibit greater impact resistance in the cold than conventional plasticizer-containing polyamides of the same flexibility. The amount of plasticizer is generally 5 to 15, preferably 8 to 12 percent by weight based on the sum of components I and II. The plasticizer can also already be contained in a plasticized polyamide which is subsequently mixed with the plasticizer-free polyether ester amide.

Utilized as component I are homopolyamides from omega-aminocarboxylic acids and/or lactams of at least 10 carbon atoms, such as polylauryllactam or polyundecanoic acid amide, preferably polylauryllactam.

Further examples of component I include, but are not limited to, polydecyllactam, polytridecyllactam or mixtures thereof.

The polyether ester amides (II) having individual components in a random distribution across the polymer chain are produced according to the process of U.S. patent application Ser. No. 888,649. This takes place by hydrolytic polycondensation under increased pressure, wherein, for instance, omega-amino undecanoic acid, and preferably lauryllactam are utilized as the polyamide-forming starting components in the present case; alpha, omega-dioxy-(polytetrahydrofuran) having a molecular weight of between 160 and 3,000, preferably between 300 and 2,200, especially between 500 and 1,200, is utilized as the diol component; and as the dicarboxylic acids, especially those of 4 to approximately 30 carbon atoms, preferably decanedicarboxylic acid, hexahydroterephthalic acid, terephthalic acid and/or isophthalic acid, are utilized.

The polyether ester amides (III) having units of the starting components randomly distributed in the polymer chain, are prepared by:

(A) heating at a temperature of about 230°–300° C. a mixture of:

(a) at least one polyamide forming compound selected from the group consisting of omega-aminocarboxylic acids having at least 10 carbon atoms, lactams having at least 10 carbon atoms, or omega-aminocarboxylic acids and lactams having at least 10 carbon atoms;

(b) an alpha, omega-dihydroxy-(polytetrahydrofuran) having an average degree of polymerization of between about 2 and 42 or a molecular weight of between 160 and 3,000; and (c) at least one organic dicarboxylic acid; in a weight ratio of (a) to [(b)+(c)] of between 30:70 and 98:2 wherein hydroxy and carboxy groups in components (b) and (c) are present in equivalent amounts, in the presence of about 2–30% by weight of water, based on the polyamide-forming compounds of group (a), under the internal pressure developed in a closed container and condensing a product;

(B) removing the water from the condensing stage (A); and (C) completely condensing the product in a second condensing stage with the exclusion of oxygen under normal pressure or under reduced pressure at about 250°–280° C.

The omega-aminocarboxylic acid and/or lactams of component II having at least 10 carbon atoms include, but are not limited to, decyllactam, lauryllactam, omega-aminododecanoic acid, aminoundecanoic acid, tridecyllactam or mixtures thereof, especially lauryllactam and/or omega-dodecanoic acid or omega-aminoundecanoic acid.

The flexibility and strength of the molding compositions can be varied by the quantitative relationship of polyamide (I) to the polyether ester amide (II), by the relationship of the proportion of polyether ester to the proportion of polyamide in the polyether ester amide (II), and by the type of polyether ester component in the polyether ester amide (II).

Within the framework of the tolerance limits which are easily determined by small-scale tests, the molding compositions can be adapted to the desired properties. In this way, the flexibility of the molding compositions is improved when the proportion of polyether ester amide (II) and the proportion of polyether ester in the polyether ester amide are increased. On the other hand, the tolerance with the polyamide component (I) decreases with the increasing of the proportion of polyether ester in the polyether ester amide and at higher molecular weights of the polytetrahydrofurandiol. If desired, the solubility in solvents can be improved with polytetrahydrofurandiol having a low molecular weight. In the usual manner, the hydrolysis resistance is improved with the utilization of aromatic dicarboxylic acids in component (II).

The molecular weight of both components I and II is expressed by the value of the relative viscosity of the solution, measured according to the conditions in m-cresol, between 1.3 and 2.4, preferably between 1.5 and 2.2, described according to DIN [German Industrial Standard] 53 727. The usual rules apply here, according to which higher-viscous products are utilized in extrusion and lower viscosity products are utilized in injection molding. In general, the viscosity values for components I and II are in the same range. However, they can also be selected from different viscosity ranges.

As already set forth, the quantitative relationship of components I and II can be varied within broad boundaries. Advantageously, the proportion of polyamide component I is between 95 and 20, preferably between 95 and 40, especially between 90 and 65 percent by weight, and correspondingly, the proportion of polyether ester amide component is between 5 and 80, preferably between 5 and 60, and especially between 10 and 35 percent by weight, respectively based on the sum of components I+II.

The proportion of polyether ester in component II is generally 2 to 70, advantageously 5 to 50, especially 10 to 35 percent by weight.

In general, the molecular weight of the polytetrahydrofurandiol contained in component II is between 160 and 3,000, preferably between 300 and 2,200, and especially between 500 and 1,200; this approximately corresponds to a mean degree of polymerization of between 2 and 42, preferably between 4 and 30, and especially between 7 and 16.

The molding compositions are especially suitable for the production of tubing or other profiles, plates or sheets.

The cold impact strength has been measured on tubing having an outer diameter of 6.35 mm. and a wall thickness of 1 mm. The tubing made from the molding compositions according to the following examples and comparative examples in a 20-D single-screw extruder having a 3 zone screw at a temperature of the material of approximately 220° C. A portion of the tubing is left untreated, a second portion is boiled in water for two hours, and a third portion is tempered in a heated furnace at 110° C. for 24 hours. Ten at a time of the tempered tubing and of the tubing treated in boiling water are subjected to a cold impact strength test at −40° C. according to SAE J 844. The number of broken tubings is given in the table.

Furthermore, the critical bending stress is determined according to DIN 53 452 on the untreated and tempered tubing.

COMPARATIVE EXAMPLE 1

(Plasticizer-Free Polyamide 12)

100 parts by weight of a polylauryllactam, $\eta_{rel}=2.15$ and 1 part by weight of N,N'-hexamethylbis(3,5-di-tert.-butyl-4-hydroxy)dihydrocinnamic acid amide are homogenized in a twin-screw masticator, granulated, and dried to a residual moisture of <0.05%.

The molding composition is used to manufacture tubing having an outer diameter of 6.35 mm. and a wall thickness of 1 mm. The tubings exhibit cold impact strength, but are rigid (see the table).

COMPARATIVE EXAMPLE 2

(Plasticizer-Containing Polyamide 12)

100 parts by weight of a polylauryllactam, $\eta_{rel}=2.15$ 15 parts by weight of benzenesulfonic acid N-n-butylamide and 1 part by weight of the stabilizer from Example 1 are homogenized in a twin-screw masticator, granulated and dried to a residual moisture of <0.05%.

Tubings made from this molding composition are flexible, but brittle in the cold.

COMPARATIVE EXAMPLE 3

(Molding Composition From Mixture)

The granulated materials of Comparative Example 1 and Comparative Example 2 are mixed in a proportion by weight of 3:1 and tubings are made from the granulated material mixture. The tubings are more flexible than those of Comparative Example 1 and exhibit better cold impact strength than those of Comparative Example 2, but show less cold impact strength than those of Comparative Example 1 and are less flexible than those of Comparative Example 2.

EXAMPLE 4

50 parts by weight of the granulated material from Comparative Example 1 are mixed with 50 parts by weight of a polyether ester amide, $\eta_{rel}=1.95$ that has been obtained from 100 parts by weight of lauryllactam, 26.29 parts $\alpha,\omega$-dihydroxy(polytetrahydrofuran) having an average molecular weight of 860 and 7.04 parts by weight of decanedicarboxylic acid, and tubings are made from the granulated material mixture. The plasticizer-free tubings are more flexible than those of Comparative Example 1 and show cold impact strength.

The polyether ester amide is prepared as follows:

100 parts by weight of lauryllactam, 26.29 parts by weight of alpha, omega-dihydroxy-(polytetrahydrofuran) having an average molecular mass of 860; 7.04 parts by weight of dodecanedioic acid; and 4.5 parts by weight of water were heated for 8 hours in a stirred autoclave to 270° C., thus attaining an internal pressure of about 19 bar. The reaction mixture was subjected to expansion for one hour, and nitrogen was passed over the mixture for 7 hours. In the last 30 minutes, 1.33 parts by weight of N,N'-hexamethylene-bis(3.5-di-tert.-butyl-4-hydroxyhydrocinnamic acid amide) was stirred into the melt as a stabilizer. The batch was then discharged and granulated. The thus-obtained colorless granules were dried to a residual moisture content of less than 0.05%.

Softening temperature—169° C.
ETA rel—1.95
Glass transition temperature—about −20° C.

EXAMPLE 5

95 parts by weight of plasticizer-containing granulated material from Comparative Example 2 and 5 parts by weight of the polyether ester amide from Example 4 are mixed and tubings are made from the granulated material mixture.

Despite a lower plasticizer content, the tubings have the same flexibility as those of Comparative Example 2 and exhibit a somewhat better cold impact strength.

EXAMPLE 6

The same procedure as in Example 5 is used, but 90 parts by weight of the plasticizer-containing granulated material from Comparative Example 2 and 10 parts by weight of the polyether ester amide from Example 4 are mixed.

Despite a lower plasticizer content, the tubings have the same flexibility as those of Comparative Example 2 and Example 5 and exhibit better cold impact strength.

EXAMPLE 7

The same procedure as in Example 6 is used, but 75 parts by weight of the plasticizer-containing granulated material from Comparative Example 2 and 25 parts by weight of the polyether ester amide from Example 4 are mixed.

Despite a lower plasticizer content, tubings having the same flexibility as in Comparative Example 2 and Examples 5 and 6 are obtained, but showing the good cold impact strength of the rigid tubings from Comparative Example 1.

EXAMPLE 8

The same procedure as in Example 7 is used, but the granulated materials are mixed in a proportion by weight of 1:1. Tubings are obtained which are practically equivalent to those from Example 7 with reference to flexibility and cold impact strength.

If proportions by weight such as 1:2, 1:3, or 1:4 are chosen, comparable results with even more improved flexibility of the tempered tubings are obtained.

EXAMPLE 9

A homogenous molding composition is produced which is identical to the granulated material mixture of Example 7 in gross composition, in that 100 parts by weight of polylauryllactam $\eta_{rel}=2.15$
39 parts by weight of the polyether ester amide of Examples 4 to 8
15 parts by weight of benzenesulfonic acid N-n-butylamide
1.4 parts by weight of the stabilizer from Comparative Example 1 are homogenized in a twin-screw masticator, granulated and dried to a residual moisture of <0.05%.

The molding composition is used to obtain tubings which are equivalent to those of Example 7 with reference to flexibility and cold impact strength.

EXAMPLE 10

The same procedure as in Example 9 is used, but the following components are employed:

100 parts by weight of polylauryllactam $\eta_{rel}=2.15$
19.5 parts by weight of polyether ester amide A
19.5 parts by weight of polyether ester amide B
15 parts by weight of benzenesulfonic acid N-n-butylamide
1.4 parts by weight of the stabilizer from Comparative Example 1
1 part by weight of a commercial polycarbodiimide stabilizer (STABAXOL PCD from the BAYER company).

The polyether ester amides A and B were obtained as follows:

Polyether ester amide A from
100 parts by weight of lauryllactam
26.34 parts by weight of $\alpha,\omega$-dihydroxy(polytetrahydrofuran) of an average molecular weight of 860 and
7.004 parts by weight of decanedicarboxylic acid.

Polyether ester amide B from
100 parts by weight of lauryllactam
27.94 parts by weight of $\alpha,\omega$-dihydroxy(polytetrahydrofuran) of an average molecular weight of 860 and
5.39 parts by weight of terephthalic acid.

The molding composition produces tubings which are equivalent to those of Examples 7 and 9 with reference to flexibility and cold impact strength.

EXAMPLE 11

75 parts by weight of granulated material from Comparative Example 2 and 25 parts by weight of a polyether ester amide $\eta_{rel}=1.85$ which has been obtained from 100 parts by weight of lauryllactam, 13.94 parts by weight of $\alpha,\omega$-dihydroxy(polytetrahydrofuran) of an average molecular weight of 860 and 3.71 parts by weight of decanedicarboxylic acid are mixed together and tubings are manufactured from the granulated material mixture.

The tubings are more flexible and exhibit a greater cold impact strength than those of Comparative Example 3 having the same plasticizer content.

| Example No. | to be compared to Comparative Example No. | Result of the Cold Impact Test① after boiling | after tempering | Critical Bending Stress in N/mm² untreated pipes | tempered pipes |
|---|---|---|---|---|---|
| 1 (Comp.) | | 0 | 0 | 45 | 52 |
| 2 (Comp.) | | 9 | 7 | 24 | 30 |
| 3 (Comp) | | 3 | 1 | 27 | 33 |
| 4 | 1 | 0 | 0 | 34 | 36 |
| 5 | 2 | 7 | 6 | 24 | 30 |
| 6 | 2 | 3 | 2 | 24 | 30 |
| 7 | 2 | 0 | 0 | 23 | 29 |
| 8 | 2 | 0 | 1 | 24 | 28 |
| 9 | 2 | 0 | 0 | 23 | 30 |
| 10 | 2 | 0 | 0 | 25 | 31 |
| 11 | 3 | 0 | 0 | 26 | 32 |

①= number of broken tubings from among the ten tested.

We claim:

1. Thermoplastic molding compositions having improved flexibility and cold impact strength, comprising a mixture of:
   I. at least one polyamide homopolymer from omega-aminocarboxylic acids or lactams having at least 10 carbon atoms; and
   II. at least one polyether ester amide copolymer with units of the starting components randomly distributed in the polymer chain produced from:
      (a) omega-aminocarboxylic acid or lactams having at least 10 carbon atoms,
      (b) alpha, omega-dihydroxy(polytetrahydrofuran) having a molecular weight of between 160 and 3,000, and
      (c) a dicarboxylic acid, wherein said mixture contains about 95 to 20 percent by weight of component I and about 5 to 80 percent by weight of component II.

2. Flexible tubing exhibiting cold impact strength and molded from the compositions of claim 1.

3. A method for the production of thermoplastic molding compositions having improved flexibility and cold impact strength, comprising mixing:
   I. about 95 to 20 percent by weight of at least one polyamide homopolymer from omega-aminocarboxylic acids or lactams having at least 10 carbon atoms; and
   II. about 5 to 80 percent by weight of at least one polyether ester amide copolymer with units of the starting components randomly distributed in the polymer chain, prepared by:
      (A) heating at a temperature of about 230°–300° C. a mixture of:
         (a) at least one polyamide forming compound selected from the group consisting of omega-aminocarboxylic acids having at least 10 carbon atoms, lactams having at least 10 carbon atoms, or omega-aminocarboxylic acids and lactams having at least 10 carbon atoms;
         (b) an alpha, omega-dihydroxy-(polytetrahydrofuran) having an average degree of polymerization of between about 2 and 42 or a molecular weight of between 150 and 3,000; and
         (c) at least one organic dicarboxylic acid; in a weight ratio of (a) to [(b)+(c)] of between 30:70 and 98:2, wherein hydroxy and carboxy groups in components (b) and (c) are present in equivalent amounts, in the presence of about 2–30% by weight of water, based on the polyamide-forming compounds of group (a) under the internal pressure developed in a closed container and condensing a product;
      (B) removing the water from the condensing stage (A); and
      (C) completely condensing the product in a second condensing stage with the exclusion of oxygen under normal pressure or under reduced pressure at about 250°–280° C.

4. The method of claim 3, wherein component I is selected from the group consisting of polyundecanoic acid amide, polylauryllactam, polydecyllactam, polytridecyllactam and mixtures thereof.

5. The method of claim 3, wherein component II(a) is selected from the group consisting of decyllactam, lauryllactam, omega-aminododecanoic acid, omega-aminoundecanoic acid, tridecyllactam and mixtures thereof.

6. The method of claim 3, wherein component II(c) is selected from the group consisting of decanedicarboxylic acid, hexahydroterephthalic acid, terephthalic acid, isophthalic acid and mixtures thereof.

* * * * *